United States Patent
Kuter-Arnebeck et al.

(10) Patent No.: US 11,672,067 B2
(45) Date of Patent: Jun. 6, 2023

(54) CIRCUIT BOARD WITH SENSOR CONTROLLED LIGHTS AND END-TO-END CONNECTION

(71) Applicant: Snap-on Incorporated, Kenosha, WI (US)

(72) Inventors: Ottoleo Kuter-Arnebeck, Kenosha, WI (US); Nicholas H. Weir, Silver Lake, WI (US); Ben Schulz, Racine, WI (US); Steven K. Hansen, Port Washington, WI (US); Robert F. Kahl, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 46 days.

(21) Appl. No.: 17/162,512

(22) Filed: Jan. 29, 2021

(65) Prior Publication Data

US 2022/0248519 A1    Aug. 4, 2022

(51) Int. Cl.
| | |
|---|---|
| H05B 47/105 | (2020.01) |
| H05B 47/18 | (2020.01) |
| H05B 47/11 | (2020.01) |
| F21V 23/04 | (2006.01) |
| F21V 23/00 | (2015.01) |

(52) U.S. Cl.
CPC ............ *H05B 47/11* (2020.01); *F21V 23/005* (2013.01); *F21V 23/0457* (2013.01); *F21V 23/0464* (2013.01); *F21V 23/0492* (2013.01)

(58) Field of Classification Search
CPC ... H05B 47/11; F21V 23/005; F21V 23/0457; F21V 23/0464; F21V 23/0492
See application file for complete search history.

(56) References Cited

U.S. PATENT DOCUMENTS

| | | |
|---|---|---|
| 4,791,536 A | 12/1988 | James |
| 5,997,152 A | 12/1999 | Ogihara et al. |
| 6,016,038 A * | 1/2000 | Mueller ............... H05B 45/325 315/312 |

(Continued)

FOREIGN PATENT DOCUMENTS

| | | |
|---|---|---|
| CN | 201244796 | 5/2009 |
| CN | 204235469 | 4/2015 |

(Continued)

OTHER PUBLICATIONS

Combined Search and Examination Report for corresponding Application No. GB2200882.5 dated Jul. 13, 2022, 8 pages.

(Continued)

*Primary Examiner* — Henry Luong
(74) *Attorney, Agent, or Firm* — Seyfarth Shaw LLP

(57) ABSTRACT

Printed circuit boards with sensor controlled illumination units and end-to-end connection capabilities. For example, a lighting element, sensor/detector, and computational control element are implemented on a printed circuit board. The printed circuit board also includes end-to-end connection terminals that allow multiple printed circuit boards to be operably coupled together in an end-to-end manner. This provides a scalable system that can be modularized to a base unit for installation in various packages, orientations, or environments.

18 Claims, 7 Drawing Sheets

(56) References Cited

U.S. PATENT DOCUMENTS

| | | | |
|---|---|---|---|
| 6,166,496 A * | 12/2000 | Lys | H05B 47/155 |
| | | | 315/316 |
| 6,461,019 B1 | 10/2002 | Allen et al. | |
| 6,491,412 B1 | 12/2002 | Mohacsi et al. | |
| 6,494,590 B1 | 12/2002 | Paganini et al. | |
| 6,659,622 B2 | 12/2003 | Iso et al. | |
| 6,971,765 B2 | 12/2005 | Wu | |
| 7,036,962 B2 | 5/2006 | Chan | |
| 7,102,172 B2 | 9/2006 | Fraitag et al. | |
| 7,178,941 B2 | 2/2007 | Morgan et al. | |
| 7,322,718 B2 | 1/2008 | Matsui et al. | |
| 7,658,501 B2 | 2/2010 | Niemann | |
| 7,775,681 B2 | 8/2010 | Kim et al. | |
| 7,862,195 B2 | 1/2011 | Douglas et al. | |
| 8,001,455 B2 | 8/2011 | Gloege et al. | |
| 8,262,250 B2 | 9/2012 | Li et al. | |
| 8,305,717 B2 | 11/2012 | Parker et al. | |
| 8,308,320 B2 | 11/2012 | Carney et al. | |
| 8,344,410 B2 | 1/2013 | Burghardt et al. | |
| 8,604,509 B2 | 12/2013 | Wendler et al. | |
| 8,611,057 B2 | 12/2013 | Crawbuck et al. | |
| 8,632,214 B1 | 1/2014 | Tickner et al. | |
| 8,641,229 B2 | 2/2014 | Li | |
| 8,757,838 B2 | 7/2014 | Hente et al. | |
| 8,764,220 B2 | 7/2014 | Chan et al. | |
| 8,777,453 B2 | 7/2014 | Deely et al. | |
| 8,905,579 B2 | 12/2014 | Dobbins et al. | |
| 9,101,027 B2 | 8/2015 | Donegan et al. | |
| 9,222,655 B2 | 12/2015 | Radermacher | |
| 9,228,732 B2 | 1/2016 | Li | |
| 9,476,579 B2 | 10/2016 | Kamitani et al. | |
| 9,510,413 B2 | 11/2016 | Athalye et al. | |
| 9,518,706 B2 | 12/2016 | Chan et al. | |
| 9,573,257 B2 | 2/2017 | Kynast et al. | |
| 9,638,401 B2 | 5/2017 | Li | |
| 9,967,957 B2 | 5/2018 | Hall et al. | |
| 10,207,380 B2 | 2/2019 | Hegarty et al. | |
| 10,724,712 B2 | 7/2020 | Li | |
| 10,757,767 B2 * | 8/2020 | Song | H05B 45/37 |
| 10,813,201 B1 | 10/2020 | Ghahramani | |
| 2002/0149933 A1 | 10/2002 | Furry et al. | |
| 2003/0057886 A1 * | 3/2003 | Lys | F21V 21/002 |
| | | | 315/324 |
| 2003/0222587 A1 * | 12/2003 | Dowling, Jr. | H05B 45/10 |
| | | | 315/149 |
| 2006/0002110 A1 | 1/2006 | Dowling et al. | |
| 2009/0021955 A1 * | 1/2009 | Kuang | H05B 45/48 |
| | | | 362/478 |
| 2009/0129088 A1 | 5/2009 | Custodis | |
| 2009/0147503 A1 | 6/2009 | Bennett | |
| 2010/0219758 A1 * | 9/2010 | Melzner | F21V 31/04 |
| | | | 315/297 |
| 2012/0050606 A1 | 3/2012 | Debevec | |
| 2012/0320595 A1 | 12/2012 | Enke | |
| 2016/0234892 A1 | 8/2016 | Niebert | |
| 2017/0103926 A1 | 4/2017 | Aoyagi et al. | |
| 2020/0096162 A1 | 3/2020 | May | |
| 2020/0323059 A1 | 10/2020 | Hua | |
| 2021/0144834 A1 * | 5/2021 | De Vries | F21V 23/0478 |

FOREIGN PATENT DOCUMENTS

| | | |
|---|---|---|
| CN | 111713180 | 9/2020 |
| CN | 112154714 | 12/2020 |
| DE | 102008003484 | 7/2009 |
| JP | 2009226513 | 10/2009 |
| JP | 2011020230 | 2/2011 |
| TW | 201340777 | 10/2013 |
| WO | 2009008428 | 1/2009 |
| WO | 2012160390 | 11/2012 |
| WO | 2017207423 | 12/2017 |

OTHER PUBLICATIONS

Taiwan Office Action for corresponding Application No. 11120760590 dated Aug. 3, 2022, 9 pages.

* cited by examiner

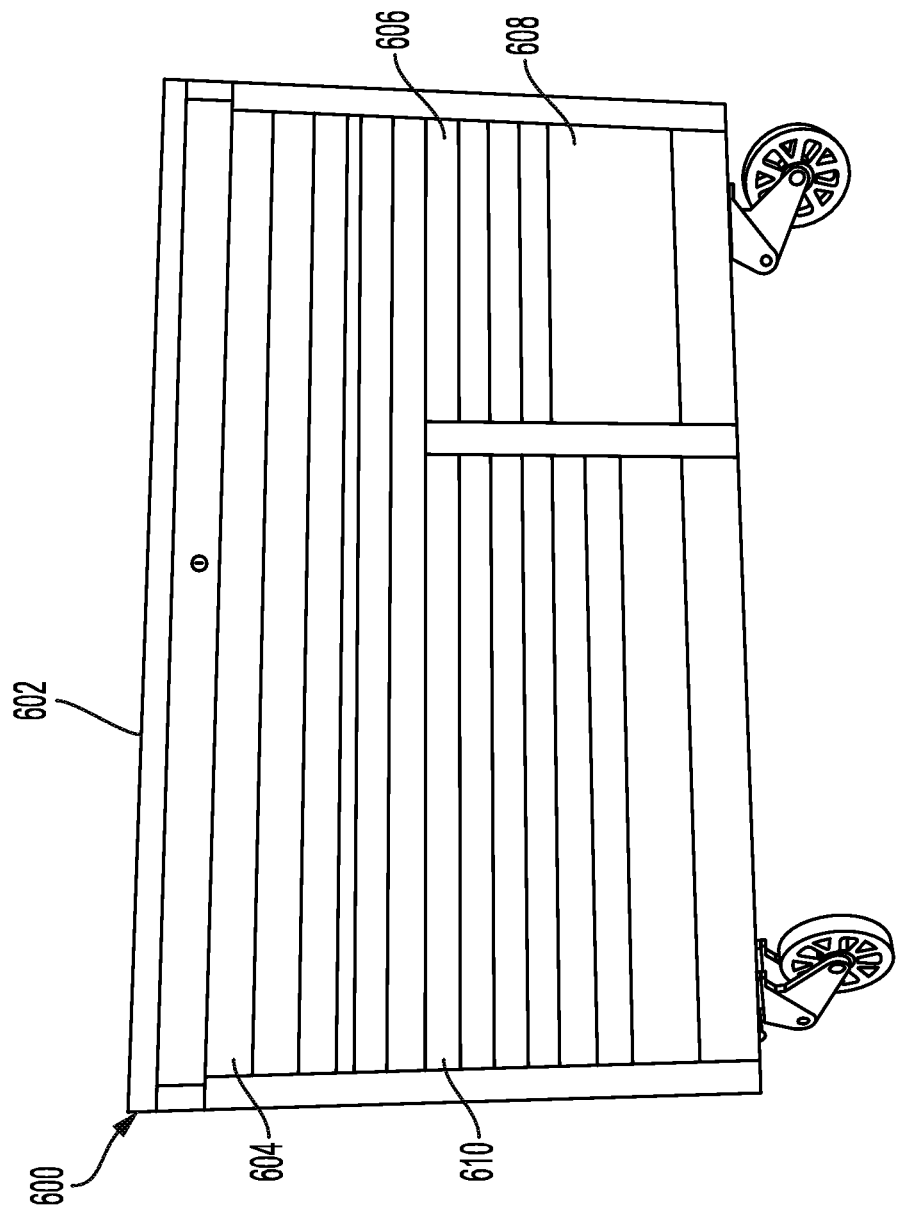

CIRCUIT BOARD WITH SENSOR CONTROLLED LIGHTS AND END-TO-END CONNECTION

TECHNICAL FIELD OF THE INVENTION

The present invention relates generally to printed circuit boards with end-to-end connection capabilities, and more particularly to printed circuit boards with sensor controlled illumination units and end-to-end connection capabilities.

BACKGROUND OF THE INVENTION

The desire to activate and deactivate lighting elements based on detection of events in a surrounding environment is common. In general, lighting elements can be connected to sensors or detectors, and illuminate an area or object in response to an environmental signal, such as motion, sound, heat, humidity, etc. However, the size of the packaging to implement this functionality can be large because the necessary sensors may require special power requirements, lensing, and/or placement that is independent of a circuits that controls the lighting element.

In other examples, the lighting element is physically decoupled from the sensor, and the lighting element and sensor are on separate independent circuits. In these examples, the sensor may be coupled to a switch that controls power supplied to the lighting element. This arrangement can be practical in light of size limitations and/or availability of off the shelf sensors and lighting elements.

SUMMARY OF THE INVENTION

The present invention relates broadly to printed circuit boards with sensor controlled illumination units and end-to-end connection capabilities. For example, an illumination circuit, sensor/detector, and computational control element are implemented on a same printed circuit board. The printed circuit board also includes end-to-end connection terminals (such as input/output (I/O data and power circuits and/or lines)) that provide for multiple printed circuit boards to be coupled together in a series and/or parallel configuration. This provides a scalable system that can be modularized to a base unit for installation in various packages, orientations, or environments.

By incorporating sensor and illumination circuitry on the printed circuit board, the overall package size can be minimized and assembly complexity reduced. Further, by providing I/O data and power circuits and/or lines, multiple printed circuit boards can be operatively coupled together to increase system capacity or to increase overall size, as needed. Such a modular sensor based illumination system can be scaled and controlled by external switches or data computational elements.

In an embodiment, the present invention relates broadly to a light module. The light module includes a printed circuit board having a power circuit with first and second input/output (I/O) power terminals, and a first data circuit with first and second I/O data terminals. A microcontroller module is disposed on the printed circuit board and operably coupled to the first data circuit. A sensor module is disposed on the printed circuit board and operably coupled to the microcontroller module via a second data circuit, wherein the microcontroller module is adapted to send and/or receive data from the sensor module. An illumination circuit is disposed on the printed circuit board and includes a switching element and a light element. The light element (e.g., LED) is operably coupled to the power circuit, and the switching element is operably coupled to the microcontroller module via the first data circuit, and the switching element is adapted to send and/or receive a signal from the microcontroller module to cause the light element to illuminate.

In an embodiment, the light module may be a first light module operably coupled to a second light module. For example, the first I/O power terminal of the second printed circuit board can be operably coupled to the second I/O power terminal of the first printed circuit board, and the first I/O data terminal of the second printed circuit board can be operably coupled to the second I/O data terminal of the first printed circuit board.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

FIG. 7 is a perspective view of an exemplar tool storage unit, where one or more exemplar modules of a lighting system can be implemented, according to an embodiment of the present invention.

DETAILED DESCRIPTION

Figure 1:
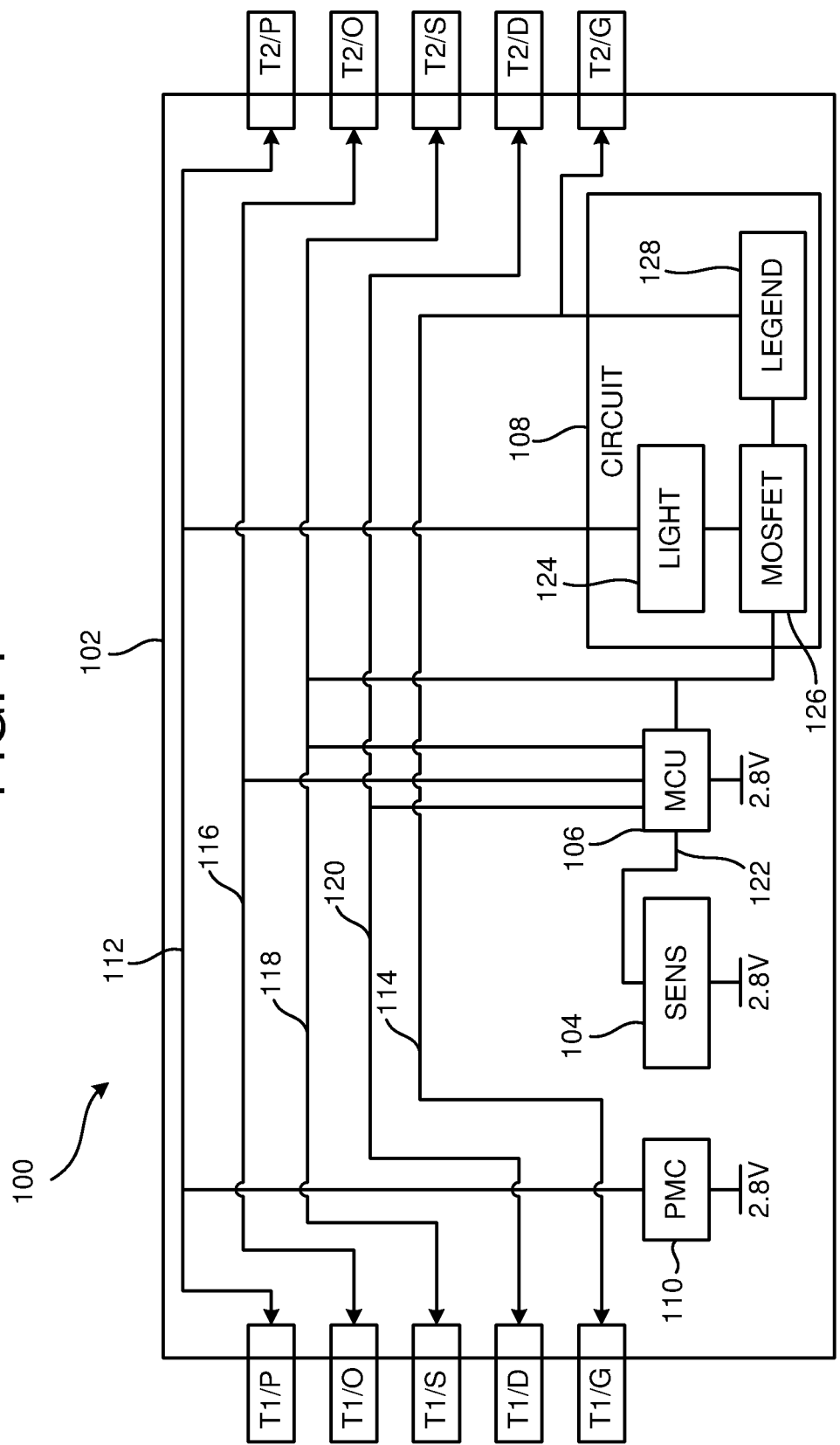
FIG. 1 is a schematic of an exemplar module of a lighting system, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to printed circuit boards with sensor controlled illumination units and end-to-end connection capabilities. For example, a printed circuit board (PCB) of the invention generally includes a sensor module, a microcontroller module, an illumination circuit, a power management module, an electrical circuit adapted to provide electrical energy to the modules, and a data circuit to operably couple the microcontroller module to the illumination circuit and the sensor module. The data and power circuits are operably coupled to points of contact on at least one location, and preferably two or more locations on the PCB where similarly configured or identically configured PCBs may be operably coupled to the power and data circuits. For example, input/output (I/O) connecting points for the data and electrical circuit may be at opposing sides of the PCB to allow the PCB to be operably coupled in series or parallel configuration to another PCB. This provides a scalable system that can be modularized to a base unit for installation in various packages, orientations, or environments.

By incorporating the sensor module and illumination circuit on the printed circuit board, the overall package size can be minimized and assembly complexity reduced. Further, by providing I/O data and power circuits and/or lines, multiple printed circuit boards can be operably coupled together to increase system capacity and/or to increase overall size, as needed. Such a modular sensor based illumination system can be scaled and controlled by external switches and/or data computational elements.

Referring to FIG. 1, an exemplary module 100 of a lighting system is shown. The module 100 includes a printed circuit board (PCB) 102, a sensor module 104, a microcontroller module 106, an illumination circuit 108, a power management module 110, an electrical circuit 112 adapted to provide electrical energy to the modules, ground circuit 114, and one or more of first second, and third data circuits 116, 118, and 120 to operably couple the microcontroller module 106 to the illumination circuit 108 and the sensor module 104. Each of the sensor module 104, microcontroller module 106, illumination circuit 108, and power management module 110 may be disposed on and operably coupled to the PCB 100.

The PCB 102 may also include input/output (I/O) terminals for transmitting electrical energy or power, such as a first and second power terminals T1/P, T2/P operably coupled to the electrical circuit 112; I/O terminals for data, such as, first and second O data terminals T1/O, T2/O operably coupled to the first data circuit 116, first and second S data terminals T1/S, T2/S operably coupled to the second data circuit 118, and first and second D data terminals T1/D, T2/D operably coupled to the third data circuit 120; and I/O terminals for ground, such as first and second ground terminals T1/G, T2/G operably coupled to ground circuit 114.

The sensor module 104 is operably coupled to the microcontroller module (MCU) 106 via an I/O data circuit 122, and may be operably coupled to the power circuit 112 via the power management module (PMC) 110. The sensor module 104 may be any type of sensor adapted to detect a trigger, such as, for example, motion, temperature, humidity, proximity of a user or operator, etc.

The MCU 106 is also operably coupled to the first second, and third data circuits 116, 118, and 120, and may be operably coupled to the power circuit 112 via the power management module (PMC) 110. The first and third data circuits 116, 120 may also function as I/O connectivity into and out of the PCB 102. The MCU 106 processes, conditions, and interprets data received from sensor module 104 via the I/O data circuit 122 to make logical decisions based on instructions stored in a memory of the MCU 106.

The illumination circuit 108 and power management module (PMC) 110 are operably coupled to the power circuit 112. The PMC 110 may convert input power (such as, for example, 12V DC power) to another level, such as a lower power level, for example 2.8V DC. The lower power level, 2.8V DC, can be used to power other components on the PCB 102 such as the sensor module 104 and the MCU 106.

The illumination circuit 108 is also operably coupled to the second data circuit 118 and the MCU 106 via the second data circuit 118. In an embodiment, the illumination circuit 108 includes a lighting element 124, a switching element, such as, for example, a MOSFET 126, and a legend 128. The lighting element 124 may be any type of element that illuminates. In an example, the lighting element 124 is a light emitting diode (LED).

As illustrated, the lighting element 124, MOSFET 126, and legend 128 may be operably coupled to the power circuit 112. The MOSFET 126 may also be operably coupled to the second data circuit 118. The MCU 106 uses data received from a sensor source of the sensor module 104 via the I/O data circuit 122 to send signals and/or data to the MOSFET 126 to instruct the MOSFET 126, via the second data circuit 118, to switch between OFF and ON states, and to thereby selectively cause the lighting element 124 to operate or not operate.

In an embodiment, the MOSFET 126 may cause illumination or cease illumination of the lighting element 124 by operably coupling or decoupling the lighting element 124 to/from the ground circuit 114. In an another embodiment, the MOSFET 126 may trigger a switching operation to open or close the power circuit 112 into the lighting element 124. The signal from the MCU 106 that triggers the MOSFET 126 is also operably coupled to the second data circuit 118 and first and second S data terminals T1/S and T2/S. In this configuration, the MOSFET 126 can also receive signals via the second data circuit 118 which originate from a source external to the MCU 106 (such as an external switch or other module 100).

Figure 2:
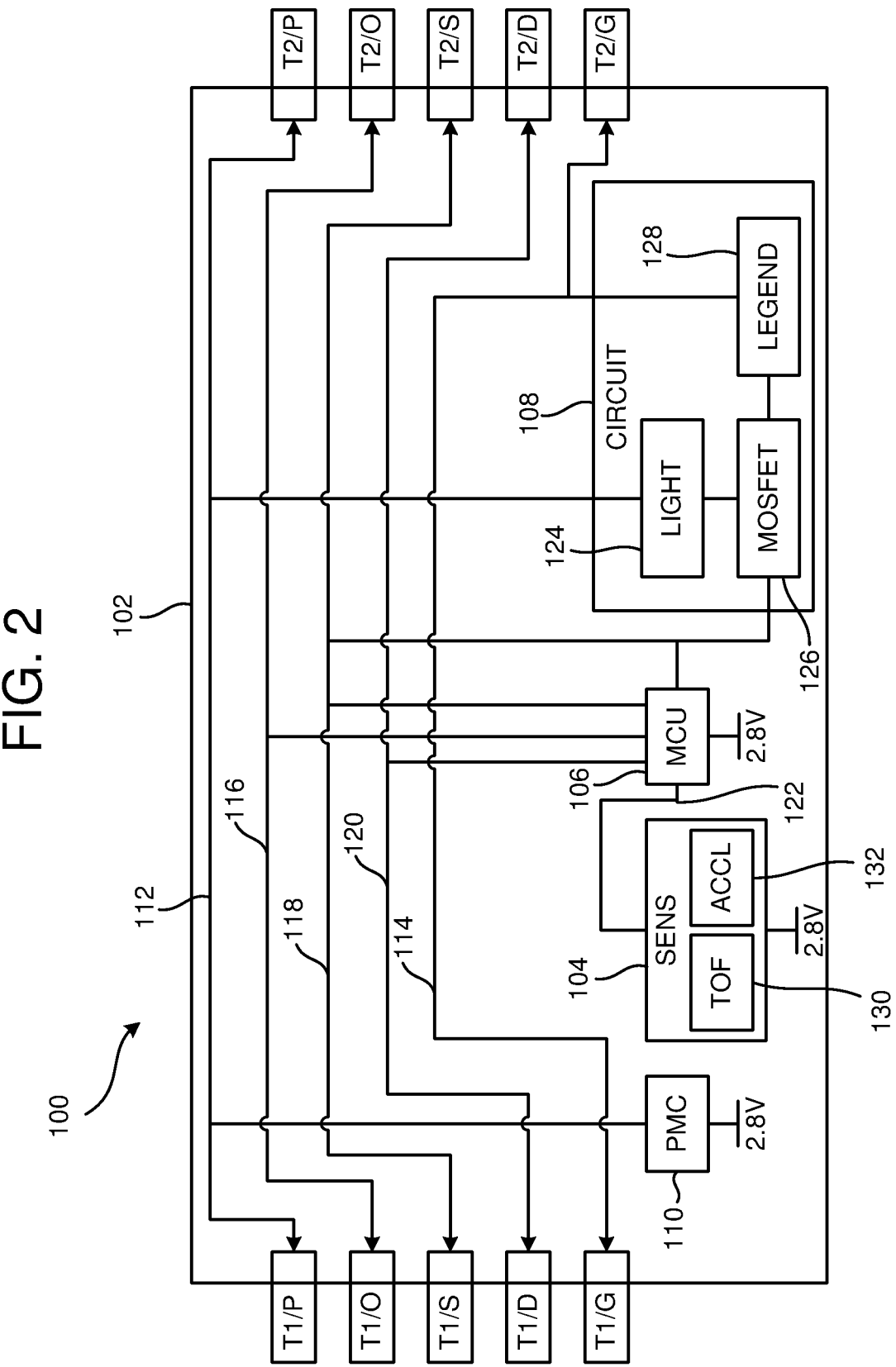
FIG. 2 is a more detailed schematic of the module of FIG. 1, according to an embodiment of the present invention.

Referring to FIG. 2, the sensor module 104 may include multiple sensors, such as, for example, a time-of-flight module 130 and/or an accelerometer 132. The time-of-flight module 130 and accelerometer 132 may be operably coupled to a low voltage power circuit, such as the lower power level, 2.8V DC of the PMC 110. The time-of-flight module 130 and accelerometer 132 may also be operably coupled to the I/O data circuit 122 to allow the time-of-flight module 130 and accelerometer 132 to communicate with the MCU 106.

As described above, the PCB 102 may include dual I/O terminals for power (T1/P, T2/P) and dual I/O data terminals (T1/O, T2/O; T1/S, T2/S; and T1/D, T2/D). The first terminals may be positioned at a first end of the PCB 102, and the second terminals may be positioned at a second end (opposite the first end) of the PCB. The dial I/O terminal allows for the PCB 102 (or module 100) to be operably coupled to additional PCBs 102 (or modules 100).

Figure 3:
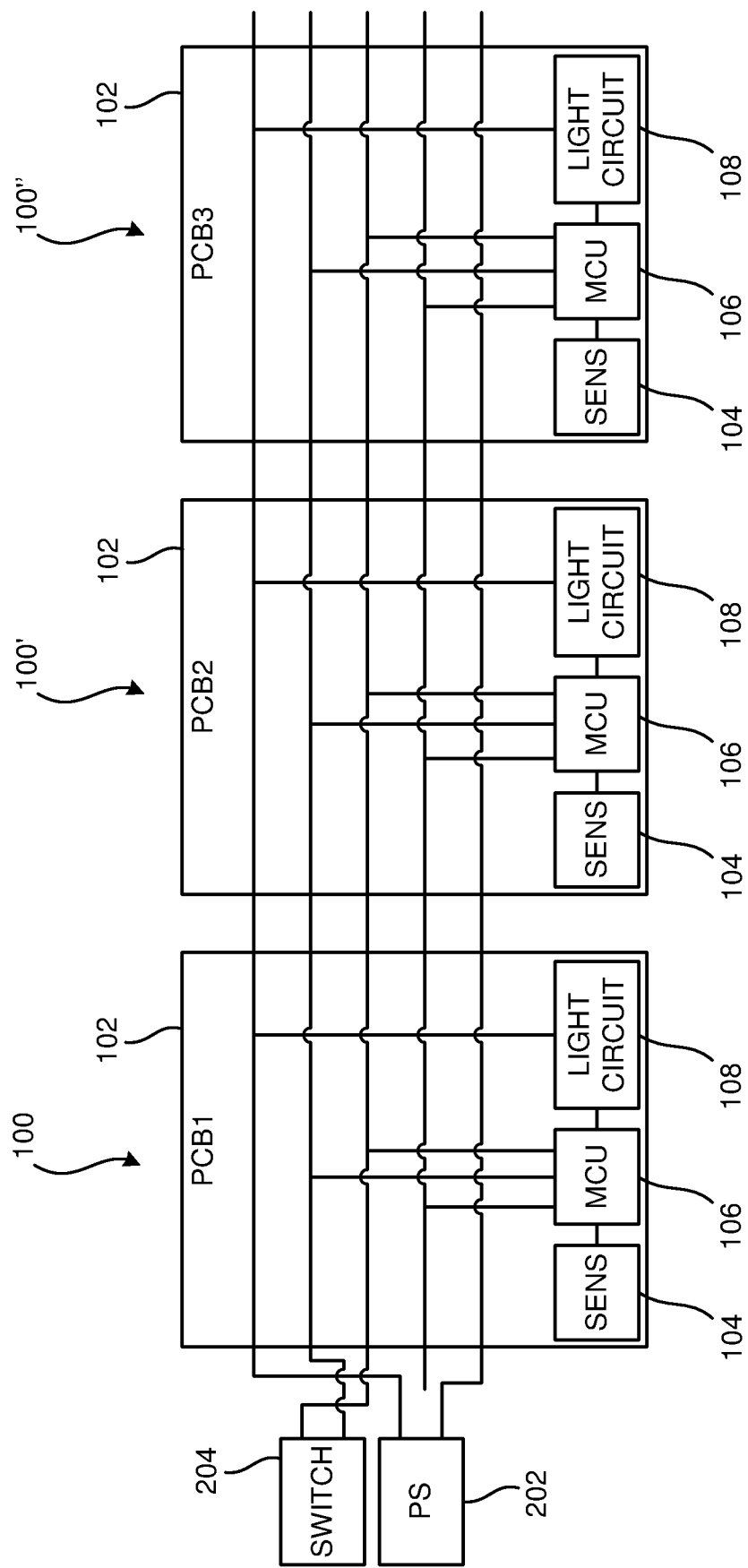
FIG. 3 is a schematic of multiple exemplar modules of a lighting system coupled together, according to an embodiment of the present invention.

Referring to FIG. 3, a first module 100 is operably coupled to a second module 100', and the second module 100' is operably coupled to a third module 100" in an end-to-end configuration to form a system or network. For example, the second power terminal T2/P, second ground terminal T2/G, second O data terminal T2/O, second S data terminal T2/S, and second D data terminal T2/D of the first module 100 are respectively operably coupled to the first power terminal T1/P, first ground terminal T1/G, first O data terminal T1/O, first S data terminal T1/S, and first D data terminal T1/D of the second module 100'. Similarly, the second power terminal T2/P, second ground terminal T2/G, second O data terminal T2/O, second S data terminal T2/S, and second D data terminal T2/D of the second module 100' are respectively operably coupled to the first power terminal T1/P, first ground terminal T1/G, first O data terminal T1/O, first S data terminal T1/S, and first D data terminal T1/D of the third module 100".

The first module 100 may also be operably coupled to a power source 202 and a switch 204. For example, the first power terminal T1/P and first ground terminal T1/G of the first module 100 are operably coupled to the power supply 202. The power source 202 may send power and/or act as a ground. The first O data terminal T1/O and first S data terminal T1/S of the first module 100 are operably coupled to the switch 204. The switch 204 can thus selectively communicate with the MCU 106 of one or more of the modules 100, 100', 100" via the first data circuit 116, and/or communicate with the MCU 106 and illumination circuit 108 of one or more of the modules 100, 100', 100" via the second data circuit 118. The communication over the second data circuit 118 may be used, for example, to select preprogrammed functions and/or algorithms stored on the memory of the MCU 106 of one or more of the modules 100, 100', 100" that direct or control operation of the system or network and connected modules 100, 100', 100".

Figure 4:
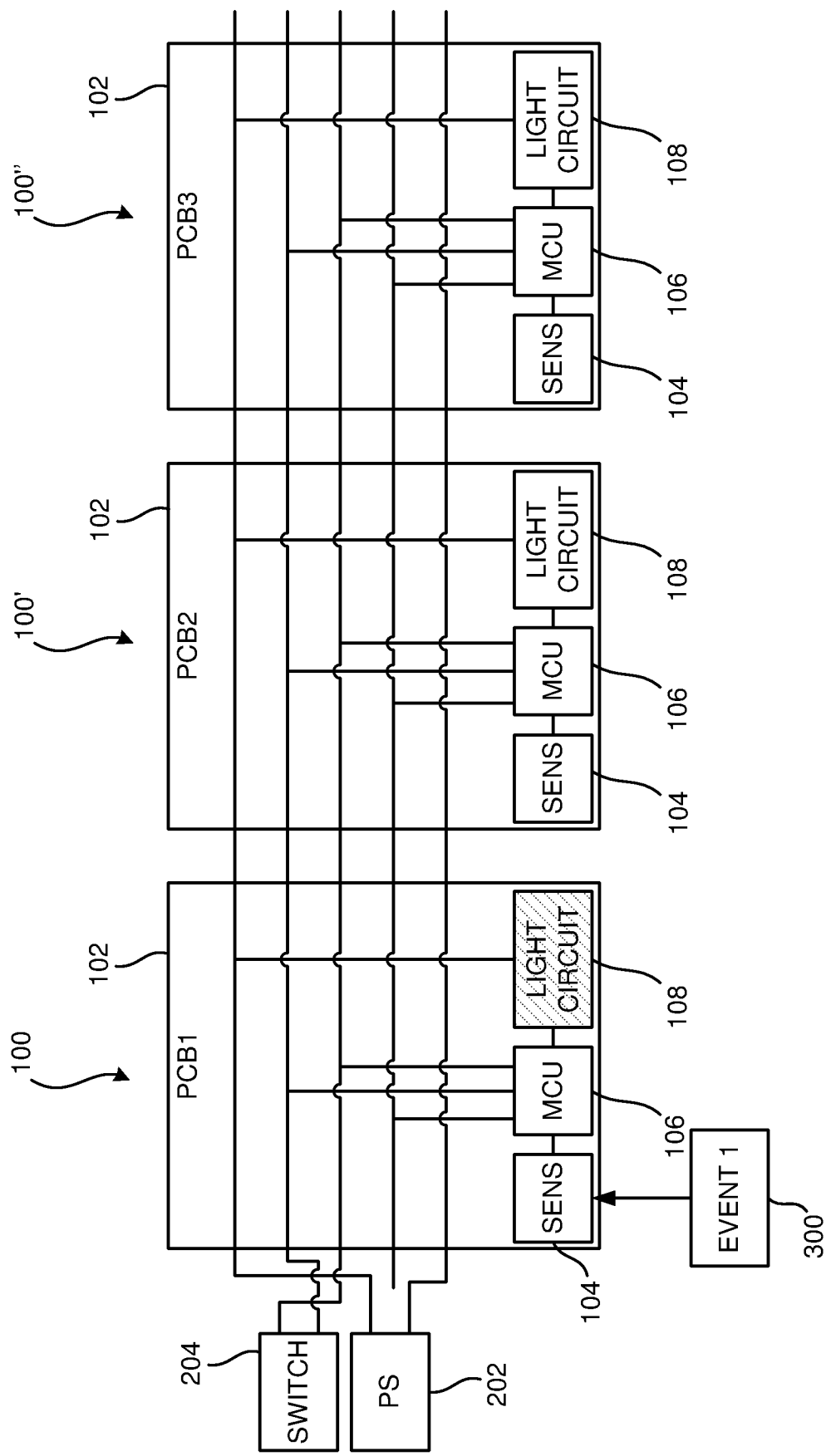
FIG. 4 is a schematic of an exemplar function of multiple exemplar modules of a lighting system coupled together, according to an embodiment of the present invention.

In an example, and referring to FIG. 4, the sensor module 104 of the first module 100 may detect an event 300. In this example, the MCU 106 of the first module 100 may cause or trigger illumination of the lighting element 124 of the first module 100. To cause or trigger illumination of the lighting element 124 of the first module 100, a signal is sent from the MCU 106 of the first module 100 via the second data circuit 118 or third data circuit 120 to the other MCUs 106 of the second and third modules 100',100". Since the second and third modules 100',100" are operably coupled to the MCU 106 of the first module 100, the second and third modules 100',100" can interpret the event 300 measured by the sensor module 104 of the first module 100 and operate as programmed (in this example, not illuminate the lighting elements 124 of the second and third modules 100',100").

Figure 5:
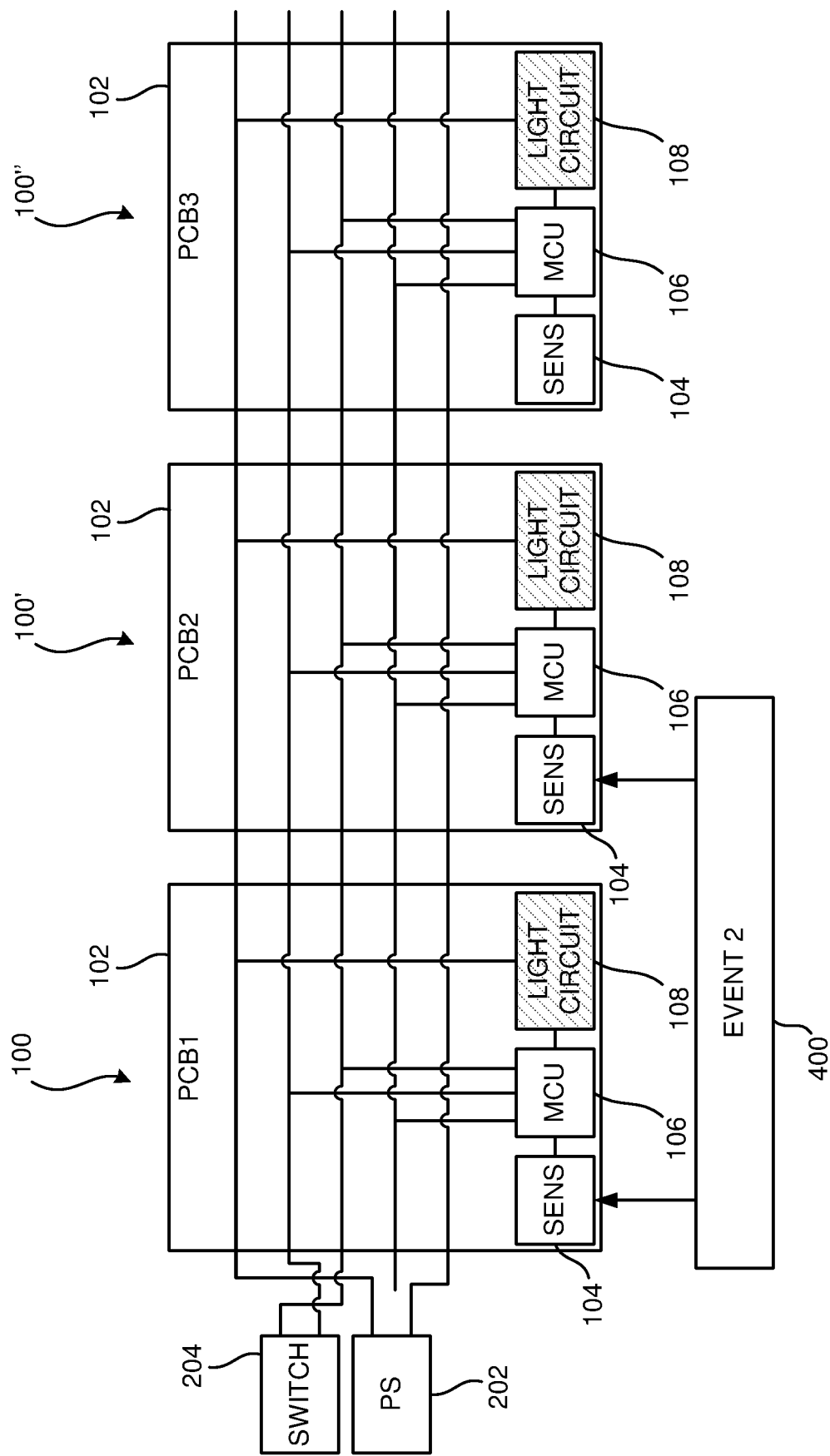
FIG. 5 is a schematic of another exemplar function of multiple exemplar modules of a lighting system coupled together, according to an embodiment of the present invention.

In another example, referring to FIG. 5, the sensor modules 104 of the first and second modules 100, 100' may detect an event 400. In this example, one or both of the MCUs 106 of the first and second modules 100, 100' may cause or trigger illumination of the lighting element 124 of each of the first, second, and third modules 100, 100', 100". To cause or trigger illumination of the lighting element 124 of each of the first, second, and third modules 100, 100', 100", a signal is sent from one or both of the MCUs 106 of the first and second modules 100, 100' via the second data circuit 118 or third data circuit 120 to the other MCUs 106. Since all of the first, second and third modules 100, 100', 100" are operably coupled, the third module 100" can interpret the event 400 and operate as programmed (in this example, illuminate the lighting element 124 of the third module 100").

Figure 6:
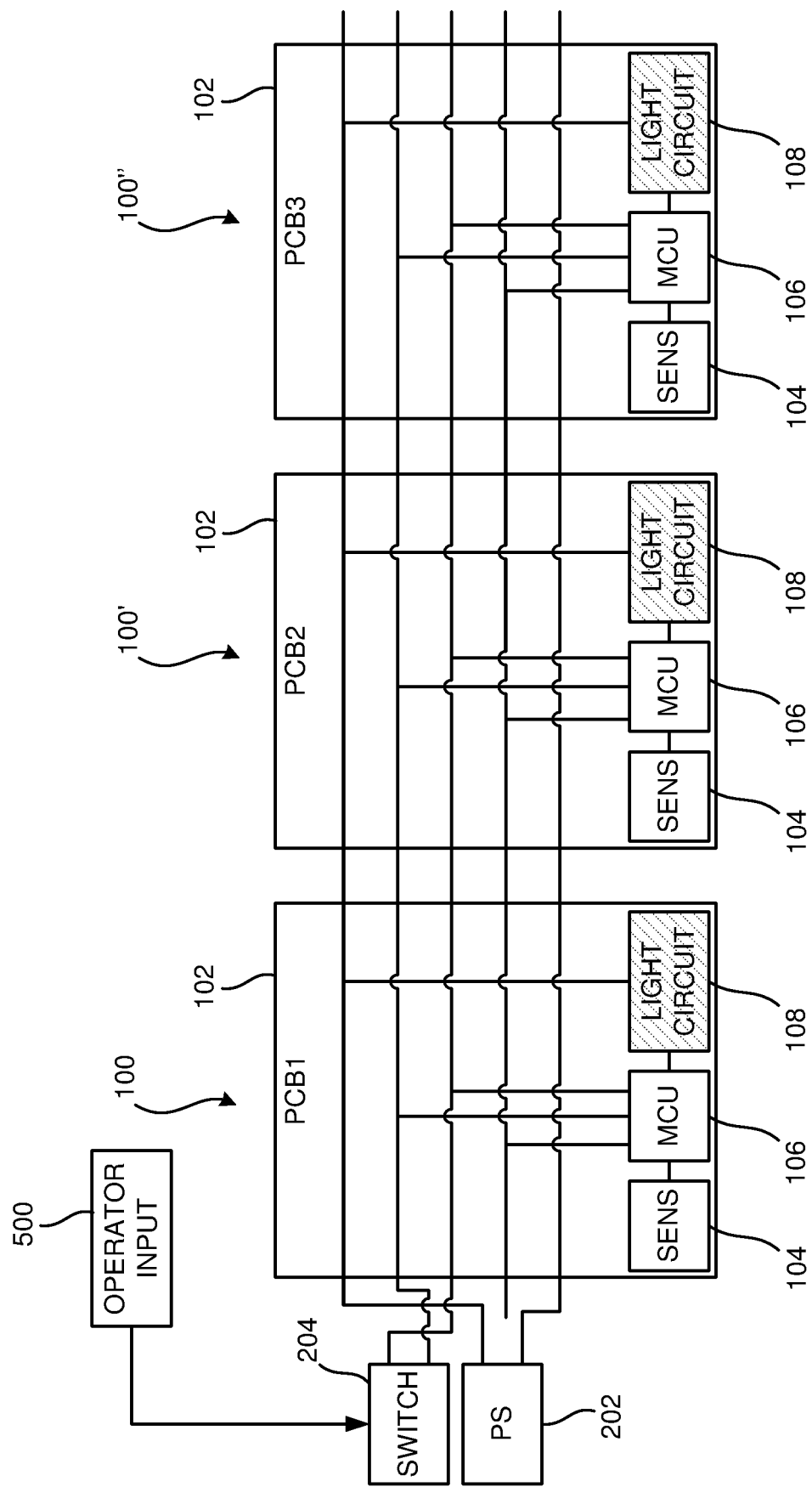
FIG. 6 is a schematic of yet another exemplar function of multiple exemplar modules of a lighting system coupled together, according to an embodiment of the present invention.

In yet another example, and referring to FIG. 6, illumination of one or more of the lighting elements of the first, second, and third modules 100, 100', 100" can be based on user actuation of the switch 204. In this example, a user can provide an operator input 500 to the switch 204 (which may be actuation of the switch 204 from an OFF position to an ON position). Actuation of the switch 204 from the OFF position to the ON position may cause one or more of the lighting elements of any of the first, second, and third modules 100, 100', 100" to illuminate. Since all of the first, second and third modules 100, 100', 100" are operably coupled, the switch 204 can send instructions to one or all of the MCUs 106 of the first, second and third modules 100, 100', 100", which cause illumination of each of the lighting elements 124 of the first, second and third modules 100, 100', 100".

It should be appreciated that any number of modules 100 may be operably coupled together to form a system or network as desired. Further, each MCU 106 may include the same or different instructions stored in memory to cause illumination or cease illumination of the respective lighting element 124, as desired. Thus, each of the modules 100 can function in accordance with their own instructions, or operate based on instruction received from another module 100.

For example, each MCU 106 may include a central processing unit (CPU) for processing data and computer-readable instructions, and a memory. The MCU 106 retrieves data signals from the sensor module 104 and uses the memory for storage of instructions and data. The memory may include one or more types of volatile and/or non-volatile solid-state storage, such as random access memory (RAM), flash memory, read-only memory (ROM), magneto resistive RAM (MRAM), phase-change memory, etc. Computer instructions for operating the module(s) and its various components may be executed by the MCU 106, using the memory as temporary "working" storage at run-time. The computer instructions may be stored in memory or an external device. Alternatively, some-or-all of the executable instructions may be embedded in hardware or firmware in addition to or instead of software.

The modules 100 disclosed herein may be implemented on any number of different devices, including but not limited to, power tools, hand tools, tool storage units, etc. In an example, and referring to FIG. 7, multiple modules 100 can be implemented in a tool storage unit 600. The tool storage unit 600 may include a top working surface 602, and one or more container spaces, such as drawers 604, 606, 608, and 610. In this example, separate modules 100 may be disposed in each of the of the drawers 604, 606, 608, and 610, and the separate modules 100 may be operably coupled together to form a network, similar to that shown and described in connection with FIGS. 3-6. The modules 100 may also be configured to illuminate the interior portions of the respective drawers 604, 606, 608, 610 based on detection of one or more events.

As described herein, by providing a module 100 incorporating the sensor module 104 and illumination circuit 108 on a printed circuit board 102, the overall package size can be minimized and/or assembly complexity reduced. Further, by providing I/O data and power circuits and/or lines, multiple modules 100 can be operably coupled together to increase system capacity and/or to increase overall size, as needed. Such a modular sensor based illumination system can be scaled and controlled by external switches or data computational elements to operate in accordance with the needs and desires of a manufacturer or operator.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A light module, comprising:
a printed circuit board including a power circuit with first and second input/output (I/O) power terminals, a first data circuit with first and second I/O data terminals, and second and third data circuits that provide I/O connectivity with the printed circuit board;
a microcontroller module disposed on the printed circuit board and operably coupled to the first data circuit;
a sensor module disposed on the printed circuit board and operably coupled to the microcontroller module via a fourth data circuit, wherein the microcontroller module is adapted to receive data from the sensor module; and
an illumination circuit disposed on the printed circuit board and including a switching element and a light element, the light element is operably coupled to the power circuit, and the switching element is operably coupled to the microcontroller module via the first data circuit, and the switching element is adapted to receive a signal from the microcontroller module to illuminate the light element.

2. The light module of claim 1, further comprising a power management module disposed on the printed circuit board and operably coupled to the power circuit, wherein the power management module is adapted to provide power to the sensor module and the microcontroller module.

3. The light module of claim 1, wherein the switching element is adapted to operably couple the light element to the power circuit to cause operation of the light element.

4. The light module of claim 1, wherein the sensor module includes at least one of a time-of-flight module and an accelerometer.

5. The light module of claim 1, wherein the second I/O power terminal and the second I/O data terminal are adapted to operably couple to a second printed circuit board of a second lighting module.

6. The light module of claim 1, wherein the printed circuit board further includes a ground circuit.

7. The light module of claim 6, wherein the switching element is adapted to operably couple the light element to the ground circuit to cause operation of the light element.

8. The light module of claim 1, further comprising a power source operably coupled to the first I/O power terminal.

9. The light module of claim 1, further comprising a switching module operably coupled to the first I/O data terminal.

10. A lighting system, comprising:
a first light module, including:
a first printed circuit board including a first power circuit with first and second input/output (I/O) power terminals, and a first data circuit with first and second I/O data terminals;
a first microcontroller module disposed on the first printed circuit board and operably coupled to the first data circuit;
a first sensor module disposed on the first printed circuit board and operably coupled to the first microcontroller module, wherein the first microcontroller module is adapted to receive data from the first sensor module; and
a first illumination circuit disposed on the first printed circuit board and including a first switching element and a first light element, the first light element is operably coupled to the first power circuit, and the first switching element is operably coupled to the first microcontroller module via the first data circuit, and the first switching element is adapted to receive a signal from the first microcontroller module to cause the first light element to operate; and
a second light module, including:
a second printed circuit board including a second power circuit with first and second I/O power terminals, and a second data circuit with first and second I/O data terminals, wherein the first I/O power terminal of the second printed circuit board is operably coupled to the second I/O power terminal of the first printed circuit board, and the first I/O data terminal of the second printed circuit board is operably coupled to the second I/O data terminal of the first printed circuit board;
a second microcontroller module disposed on the second printed circuit board and operably coupled to the second data circuit;
a second sensor module disposed on the second printed circuit board and operably coupled to the second microcontroller module, wherein the second microcontroller module is adapted to receive data from the second sensor module and the first microcontroller module; and
a second illumination circuit disposed on the second printed circuit board and including a second switching element and a second light element, the second light element is operably coupled to the second power circuit, and the second switching element is operably coupled to the second microcontroller module and the first microcontroller module via the second data circuit, and the second switching element is adapted to receive a signal from the second microcontroller module or the first microcontroller module to cause the second light element to operate, and
wherein the first printed circuit board further includes third and fourth data circuits that provide I/O connectivity with the second printed circuit board.

11. The lighting system of claim 10, wherein each of the first and second light modules further includes a power management module.

12. The lighting system of claim 10, wherein the first switching element is adapted to operably couple the first light element to the first power circuit to cause the first light element to operate.

13. The lighting system of claim 10, wherein each of the first and second sensor modules includes at least one of a time-of-flight module and an accelerometer.

14. The lighting system of claim 10, wherein each of the first and second printed circuit boards further includes a ground circuit.

15. The lighting system of claim 14, wherein the first switching element is adapted to connect the first light element to the ground circuit illuminate the first light element.

16. The lighting system of claim 10, further comprising a power source coupled to the first I/O power terminal of the first printed circuit board.

17. The lighting system of claim 10, further comprising a switching module coupled to the first I/O data terminal of the first printed circuit board.

18. The lighting system of claim 10, wherein each of the first and second switching elements includes a MOSFET.

* * * * *